(12) United States Patent
Chen

(10) Patent No.: US 9,061,546 B2
(45) Date of Patent: Jun. 23, 2015

(54) HUB ASSEMBLY FOR A BICYCLE

(71) Applicant: Kun Teng Industry Co., Ltd., Taichung (TW)

(72) Inventor: Hubert Chen, Taichung (TW)

(73) Assignee: Kun Teng Industry Co., Ltd., Taichung (TW)

( * ) Notice: Subject to any disclaimer, the term of this patent is extended or adjusted under 35 U.S.C. 154(b) by 141 days.

(21) Appl. No.: 14/010,334

(22) Filed: Aug. 26, 2013

(65) Prior Publication Data

US 2014/0062174 A1  Mar. 6, 2014

(30) Foreign Application Priority Data

Aug. 28, 2012 (TW) .............................. 101216519 U

(51) Int. Cl.
*B60B 27/02* (2006.01)
*F16D 41/30* (2006.01)
*B60B 27/04* (2006.01)
*F16D 41/12* (2006.01)

(52) U.S. Cl.
CPC .............. *B60B 27/023* (2013.01); *F16D 41/30* (2013.01); *B60B 27/047* (2013.01); *F16D 41/12* (2013.01)

(58) Field of Classification Search
CPC .............................. F16D 41/30; B60B 27/047
USPC .......................................................... 192/64
See application file for complete search history.

(56) References Cited

U.S. PATENT DOCUMENTS

| 2007/0199788 | A1 * | 8/2007 | Chen | 192/64 |
| 2008/0264748 | A1 * | 10/2008 | Chen | 192/64 |
| 2010/0122886 | A1 * | 5/2010 | Chen | 192/64 |
| 2011/0220450 | A1 * | 9/2011 | Chiang | 192/64 |
| 2013/0299295 | A1 * | 11/2013 | Yang | 192/64 |

FOREIGN PATENT DOCUMENTS

| FR | 1334006 | * | 8/1963 |
| GB | 160565 | * | 3/1921 |

* cited by examiner

*Primary Examiner* — Richard Lorence
(74) *Attorney, Agent, or Firm* — Christensen O'Connor Johnson Kindness PLLC

(57) ABSTRACT

A hub assembly for a bicycle includes a hub shell, a plurality of pawl units, and an annular ratchet member. The hub shell is rotatably mounted on a hub axle, and the annular ratchet member is disposed to rotate with respect to the hub axle. Each pawl unit includes a pawl that is movable between driven and idle positions, an elongated mount that extends to bridge a gap formed in the pawl, and a biasing member that is mounted on the elongated mount to bias the pawl to move to the driven position so as to engage to the annular ratchet member.

8 Claims, 10 Drawing Sheets

HUB ASSEMBLY FOR A BICYCLE

CROSS-REFERENCE TO RELATED APPLICATION

This application claims priority of Taiwanese application no. 101216519, filed on Aug. 28, 2012.

BACKGROUND OF THE INVENTION

1. Field of the Invention

This invention relates to a hub assembly, more particularly to a hub assembly for a bicycle.

2. Description of the Related Art

Referring to FIGS. 1 and 2, a bicycle hub assembly 10 disclosed in Taiwanese patent no. I335276 includes a hub shell 11, an annular ratchet member 12, and three pawl units each having a pawl 13 and a biasing member 14. The hub shell 11 has an inner tubular wall surface 111 which has three retreat bores 112 each having first and second retaining regions 113, 114. The annular ratchet member 12 has a plurality of cavities 121 in an outer surface thereof. The pawl 13 is inserted into the respective retreat bore 112, and has a pivot end 131 and a pawl end 132. The pivot end 131 is pivotable relative to the first retaining region 113 of the respective retreat bore 112. The pawl end 132 is movable between driven and idle positions. The biasing member 14 has a first segment 141 which is retained in the second retaining region 114 of the respective retreat bore 112, and a second segment 142 which abuts against the pawl end 132 of the respective pawl 13 so as to bias the pawl end 132 from the idle position, where the pawl end 132 is in a non-engaged state, to the driven position, where the pawl end 132 is engaged with the corresponding cavity 121. By virtue of such configuration, the hub shell 11 can foe driven to rotate with the annular ratchet member 12 only when the annular ratchet member 12 rotates in a clockwise or counterclockwise direction so as to engage the pawl ends 132 of the pawl units. However, the pawl units are inconvenient to install since the pawl 13 and the biasing member 14 of each pawl unit need be separately inserted into the respective retreat bore 112.

FIGS. 3 and 4 show another conventional bicycle hub assembly 20, which is disclosed in Taiwanese utility model no. M273524, and which includes a hub shell 21, an annular ratchet member 22, and a plurality of pawl units 23. Each pawl unit 23 includes a sleeve 24, a copper piece 25, a biasing member 26, and a pawl member 27. The sleeve 24 is inserted into a respective sleeve-receiving cavity 211 in the hub shell 21. The copper piece 25 is disposed to abut against a wall of a pawl-receiving recess 212 in communication with the sleeve-receiving cavity 211. The pawl member 27 includes a main body 270 and a pivot axle 271. The main body 270 includes a pivot end 273 which is pivotable about a pivot axis, and an opposite pawl end 274 formed with a slit 272 and engageable with the annular ratchet member 22. The pivot axle 271 extends from the pivot end 273 along the pivot axis and is insertable into and rotatable relative to the sleeve 24. The biasing member 26 has a looped segment 260 sleeved on the pivot axle 271, a first end segment 261 abutting against the inner face of the copper piece 25, and a second end segment 262 engageable with the slit 272, thereby biasing the pawl end 274 to engage the annular ratchet member 22. However, the installation of the pawl units 23 is still complicated. In addition, as the slit 272 is located at a lateral side of the main body 270 and is spaced a relatively large distance from the pivot axle 271, the biasing force of the biasing member 26 exerted through the second end segment 262 acts on only the lateral side of the main body 270, so that the engagement between the annular ratchet member 22 and the respective pawl member 27 is not steady.

SUMMARY OF THE INVENTION

Therefore, an object of the present invention is to provide a hub assembly for a bicycle, in which a pawl unit can be easily installed, and a pawl of the pawl unit can be engaged with an annular ratchet member in a more effective way.

According to this invention, a hub assembly for a bicycle includes a hub shell, a plurality of pawl units, and an annular ratchet member.

The nub shell is adapted to be mounted on and rotatable relative to the hub axle about a left-to-right axis, and has an inner tubular wall surface that is adapted to be spaced apart from the hub axle so as to define an annular accommodation space therebetween, and that extends rightwardly along the left-to-right axis to terminate at a right-side periphery. The inner tubular wall surface has a plurality of retreat bores which are angularly displaced from one another about the left-to-right axis, which are disposed proximate to the right-side periphery, and which extend outwardly and radially. Each of the retreat bores is defined by a bore-defining wall which includes first and second retaining wall faces opposite to each other in a circumferential direction, and a middle retaining wall face interposed therebetween.

Each of the pawl units includes a pawl, an elongated mount, and a biasing member. The pawl includes a pivot end which is fitted in a respective one of the retreat bores, and which has a joint surface pivotable relative to one of the first and second retaining wall faces about a pivot axis that is parallel to the left-to-right axis, and a pawl end which has an acting surface and a non-acting surface, and which extends radially from the pivot end into the annular accommodation space, such that the pawl end is movable between a driven position and an idle position. The pawl is formed to have a gap which extends from the joint surface toward the pawl end. The elongated mount extends along the pivot axis to bridge the gap. The biasing member has a biasing force to bias the pawl end toward the driven position, and includes a curved segment mounted on the elongated mount, a first end segment extending outwardly of the gap to abut against the middle retaining wall face, and a second end segment abutting against the pawl end so as to transmit the biasing force to the pawl end.

The annular ratchet member is disposed to be rotated with respect to the hub axle, and has a circumferential surface that confronts the inner tubular wall surface in radial directions, and that has a plurality of teeth angularly displaced from one another about the left-to-right axis. Each of the teeth has an abutment edge and a sweeping edge opposite to each other, such that when the annular ratchet member rotates in a clockwise direction, the pawl ends of the pawls of the pawl units are placed in the driven position where the acting surfaces thereof are pushed by the abutment edges of corresponding ones of the teeth to thereby bring the hub shell to rotate with the annular ratchet member, and such that when the annular ratchet member rotates in a counterclockwise direction, the sweeping edges of the teeth sweep past the non-acting surfaces of the pawl ends against the biasing force of the biasing members to displace the pawl ends toward the idle position to thereby prevent the hub shell from rotating with the annular ratchet member.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
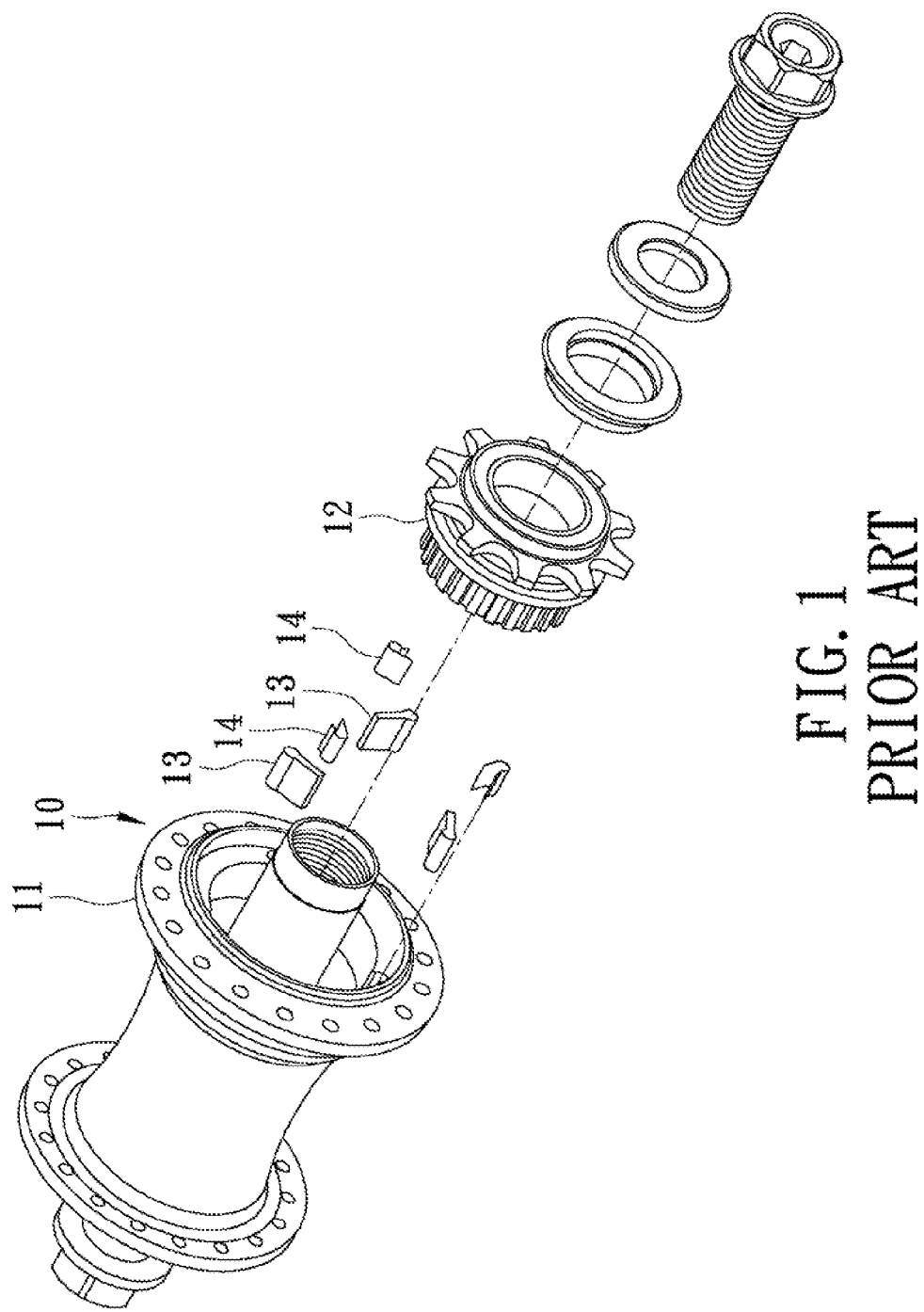
FIG. 1 is an exploded view of a conventional bicycle hub assembly disclosed in Taiwanese patent no. I335276.
Figure 2:
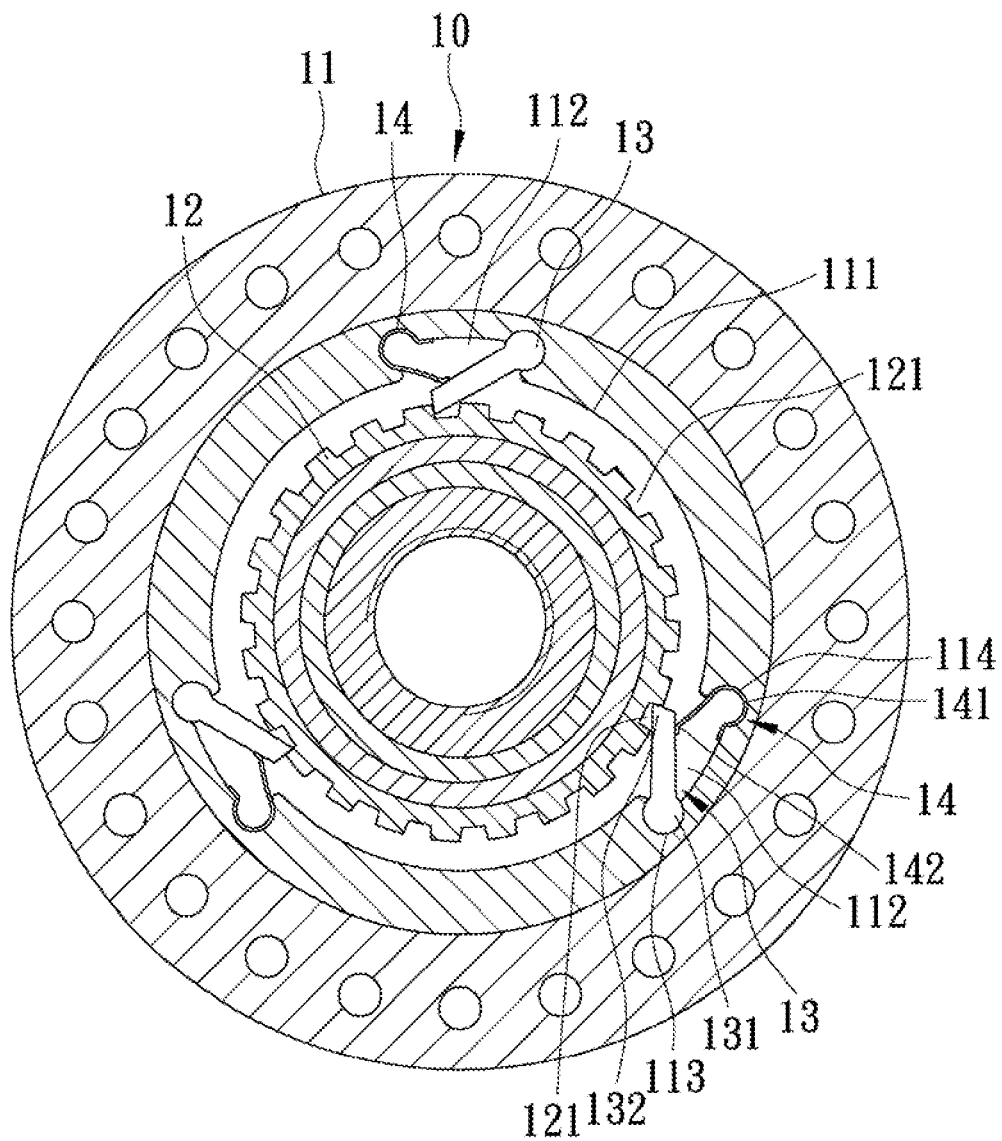
FIG. 2 is a cross-sectional view of the bicycle hub assembly of FIG. 1 in an assembled state.
Figure 3:
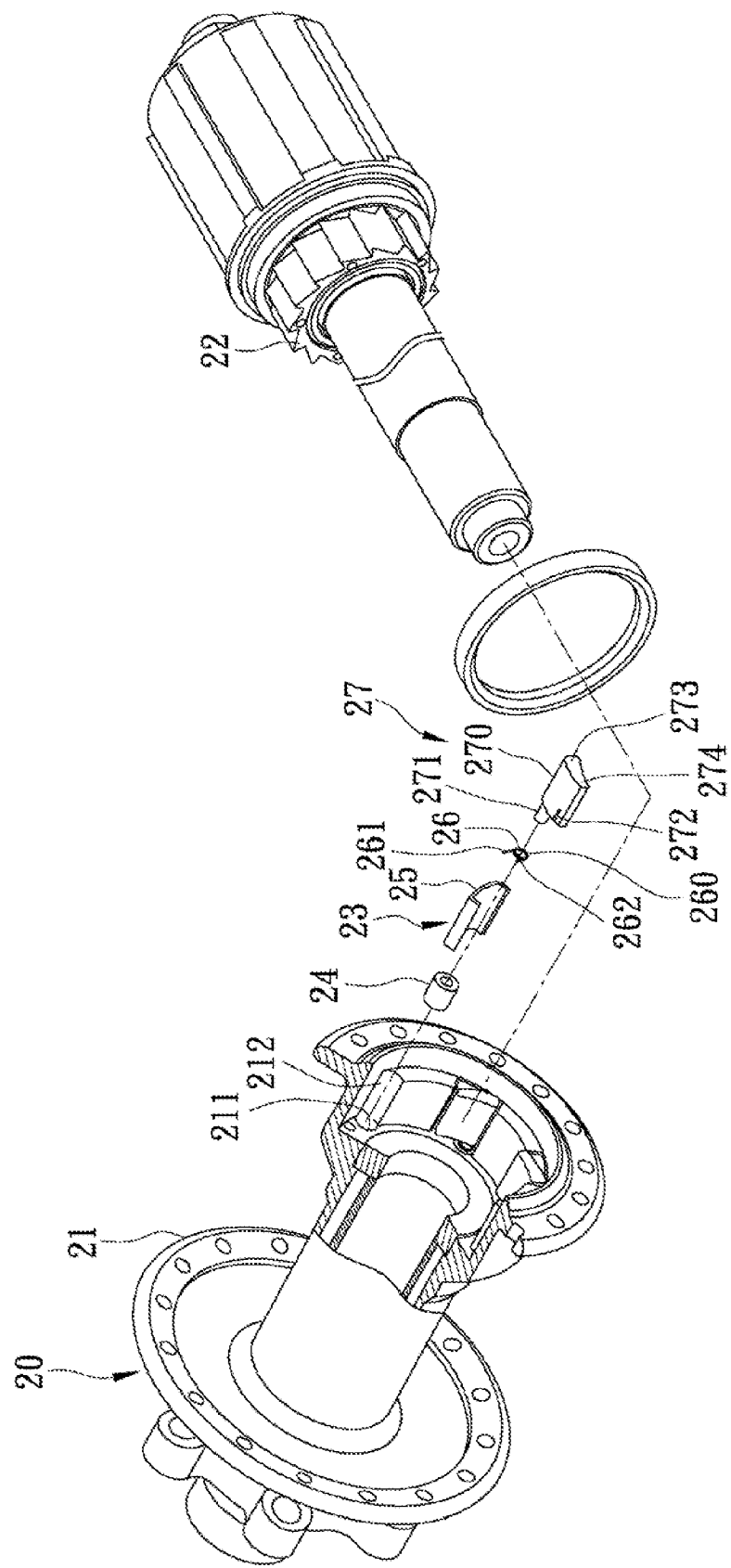
FIG. 3 is an exploded view of a conventional bicycle hub assembly disclosed in Taiwanese utility model no. M273524.
Figure 4:
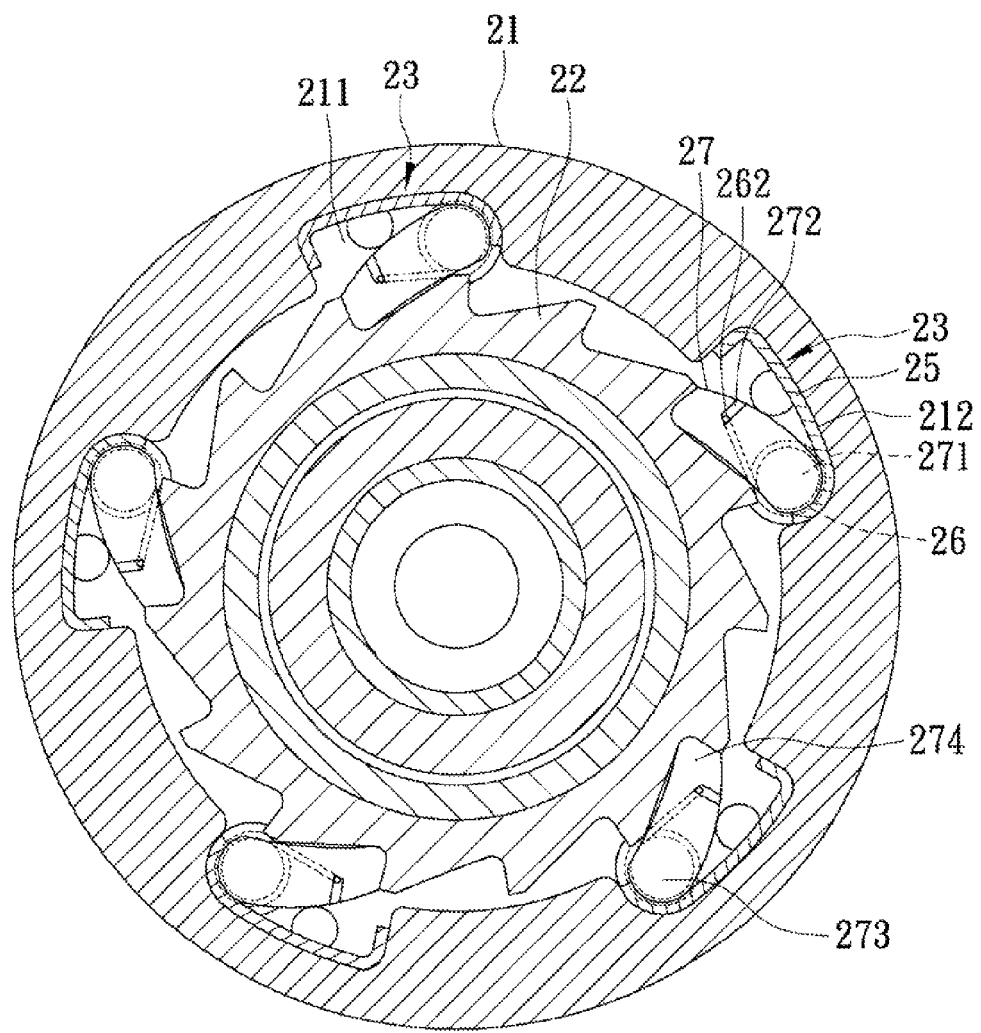
FIG. 4 is a cross-sectional view of the bicycle hub assembly of FIG. 3 in an assembled state.
Figure 5:
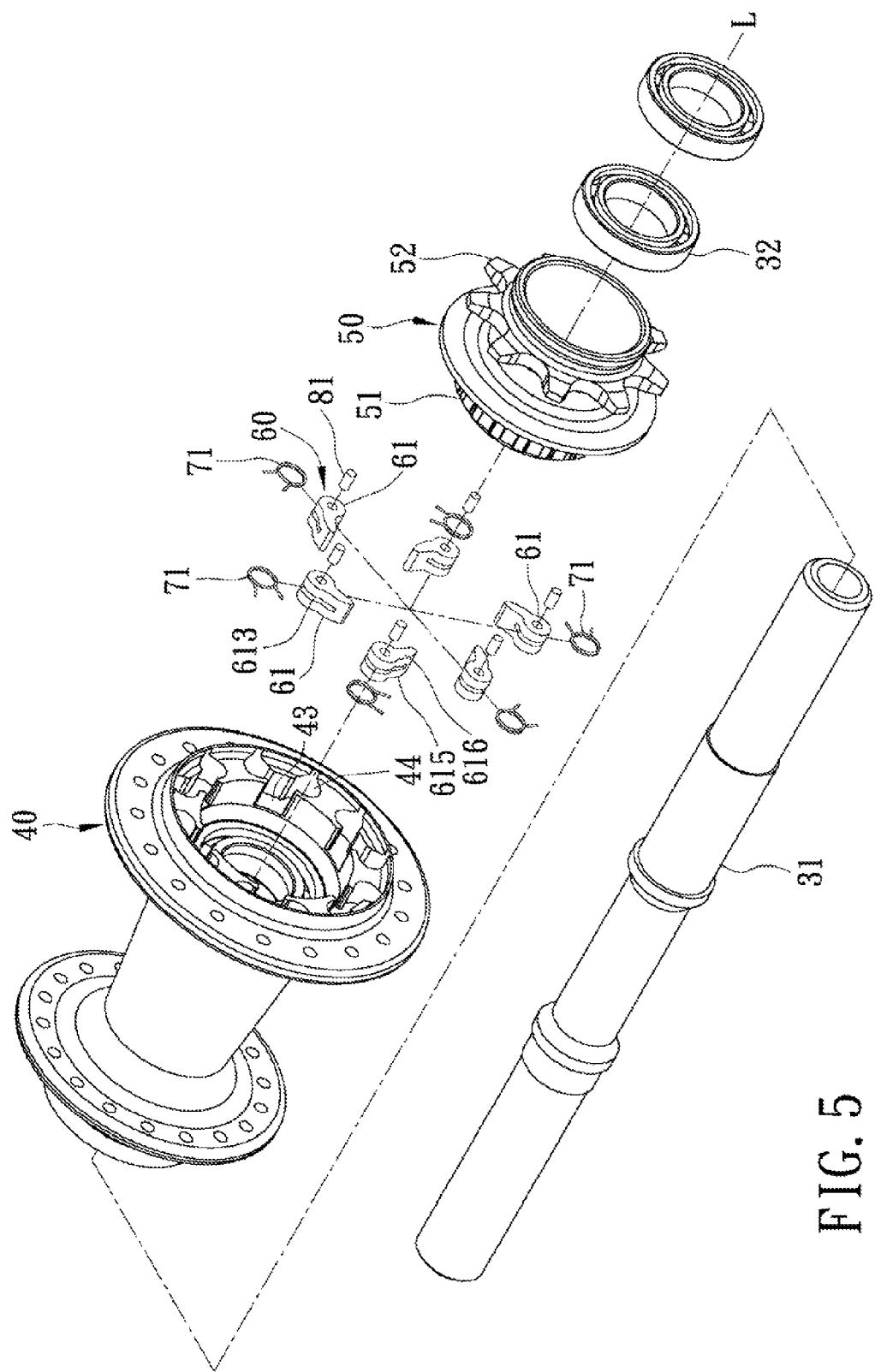
FIG. 5 is an exploded view of the preferred embodiment of a hub assembly for a bicycle according to this invention.
Figure 6:
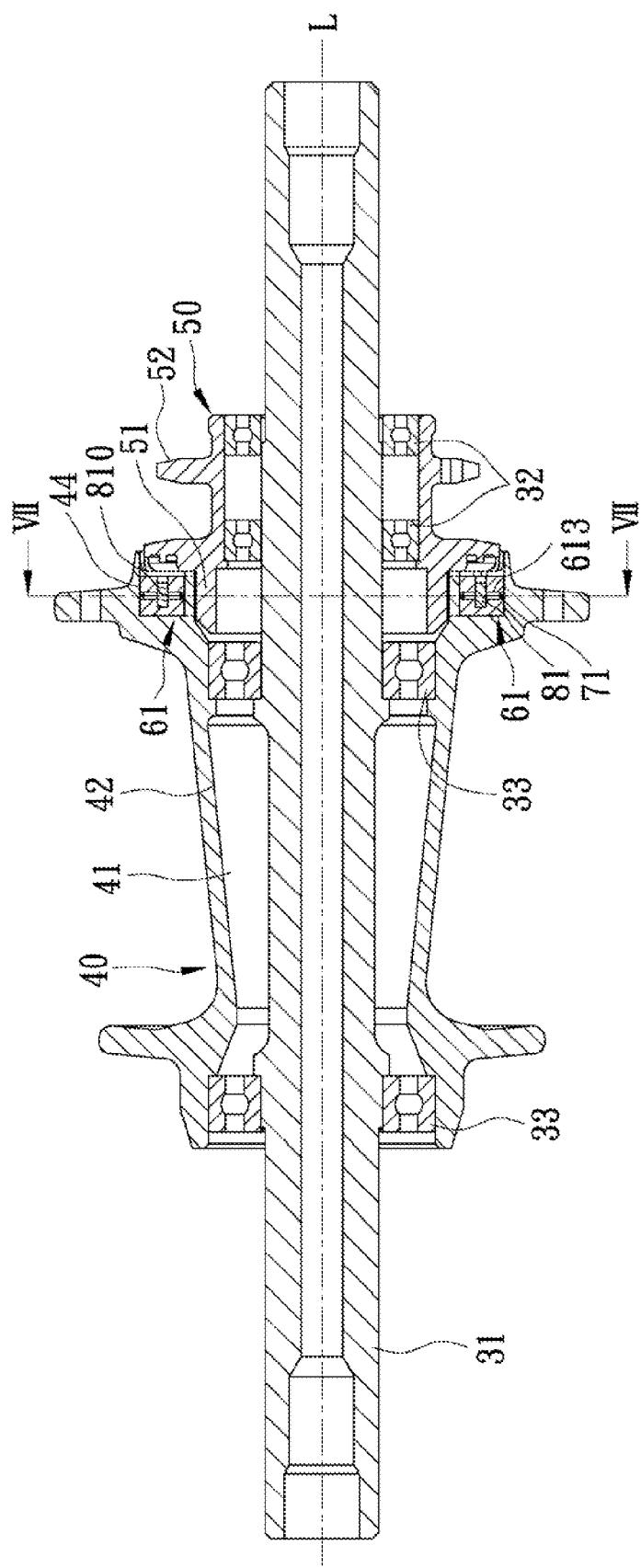
FIG. 6 is a sectional view of the preferred embodiment in an assembled state.
Figure 7:
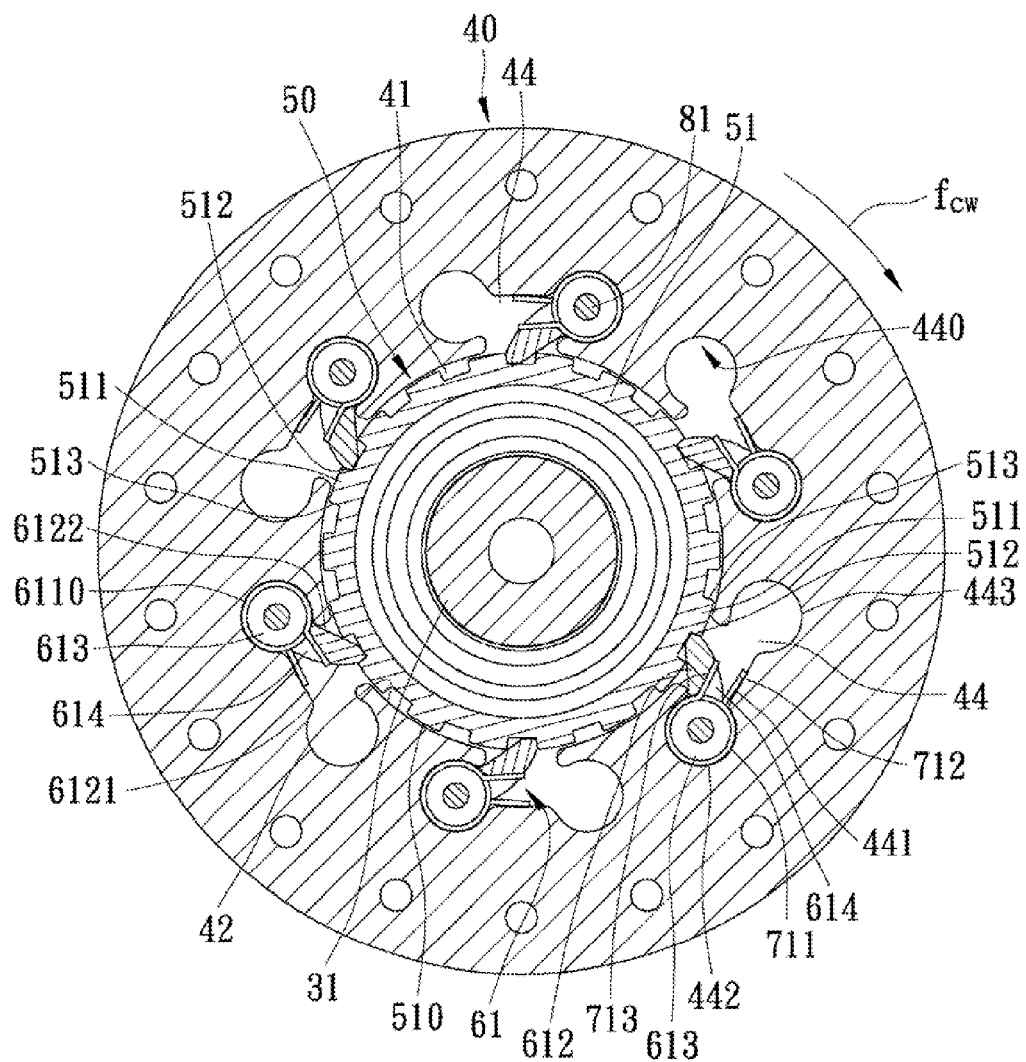
FIG. 7 is a cross-sectional view taken along line VII-VII of FIG. 6.

Referring to FIGS. 5 to 7, the preferred embodiment of a hub assembly for a bicycle (not shown) according to the present invention is shown to include a hub shell 40, a plurality of pawl units 60, and a driving unit 50.

The hub shell 40 is adapted to be mounted on and rotatable relative to a hub axle 31 of the bicycle about a left-to-right axis (L) by means of bearings 33. The hub shell 40 has an inner tubular wall surface 42 (see FIG. 6) that is adapted to be spaced apart from the hub axle 31 so as to define an annular accommodation space 41 therebetween, and that extends rightwardly along the left-to-right axis (L) to terminate at a right-side periphery. The inner tubular wall surface 42 has a plurality of retreat bores 44 which are angularly displaced from one another about the left-to-right axis (L), which are disposed proximate to the right-side periphery, and which extend outwardly and radially. Each of the retreat bores 44 is defined by a bore-defining wall 440 which includes first and second retaining wall faces 442, 443 opposite to each other in a circumferential direction, and a middle retaining wall face 441 interposed therebetween.

Each of the pawl units 60 includes a pawl 61, an elongated mount 810, and a biasing member 71.

Figure 9:
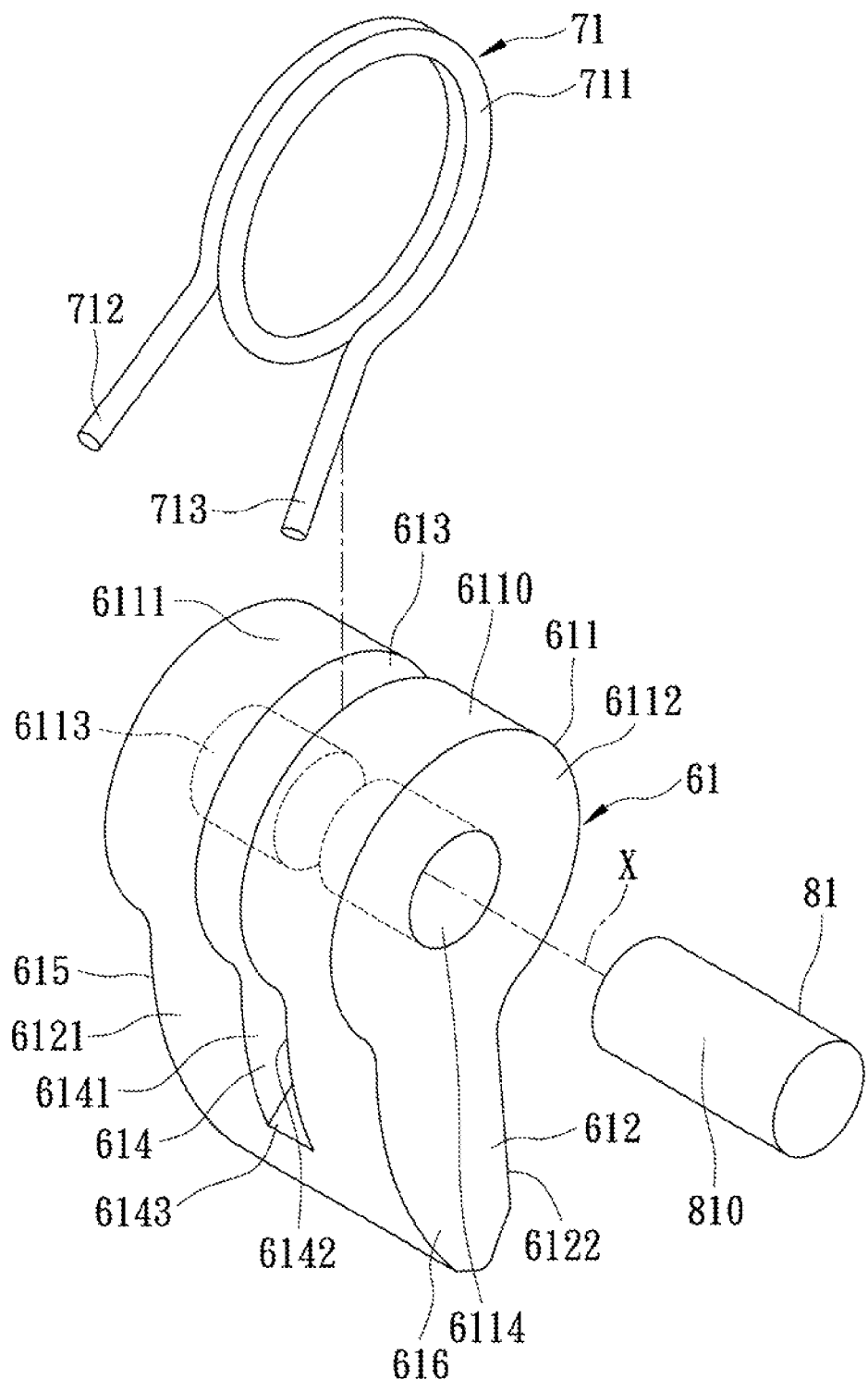
FIG. 9 is an exploded view of a pawl unit of the preferred embodiment.
Figure 10:
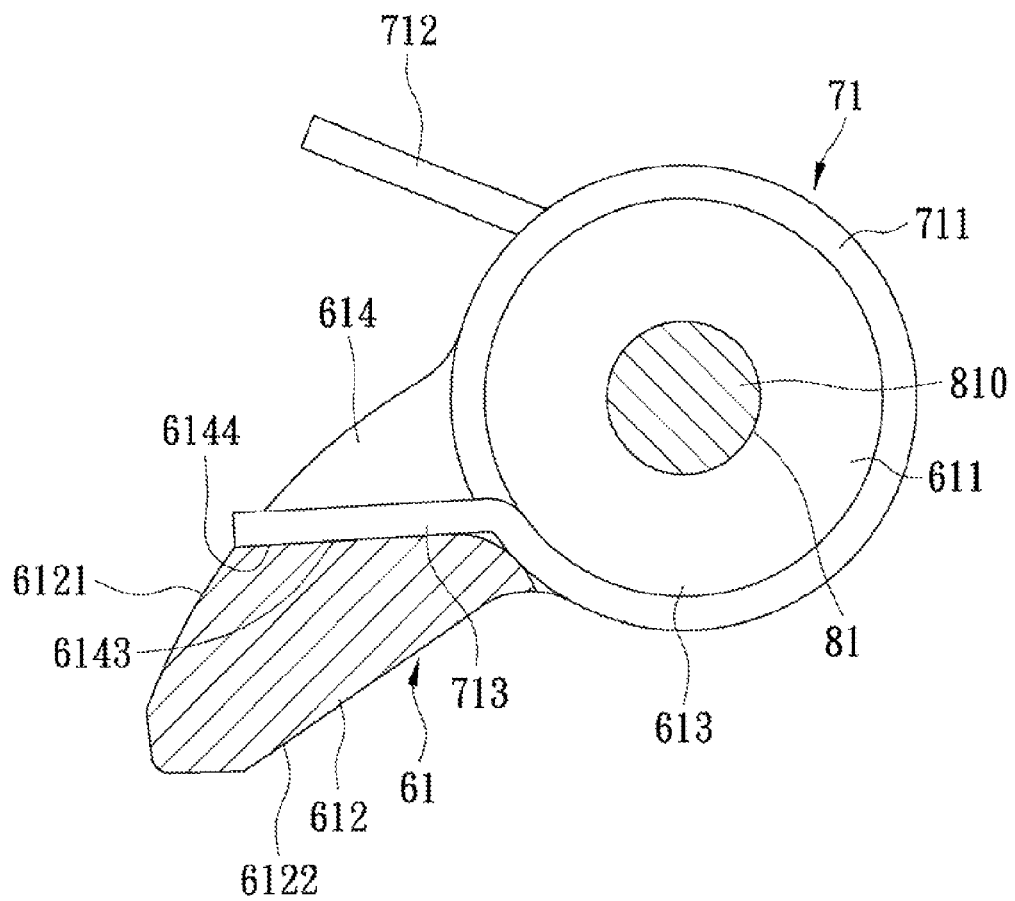
FIG. 10 illustrates a cross-sectional view of the pawl unit of FIG. 9 in an assembled state.

Referring to FIGS. 7, 9 and 10, the pawl 61 includes a pivot end 611 and a pawl end 612. The pivot end 611 is fitted in a corresponding one of the retreat bores 44, and has a joint surface 6110 pivotable relative to one of the first and second retaining wall faces 442, 443 about a pivot axis (X) that is parallel to the left-to-right axis (L).

Figure 8:
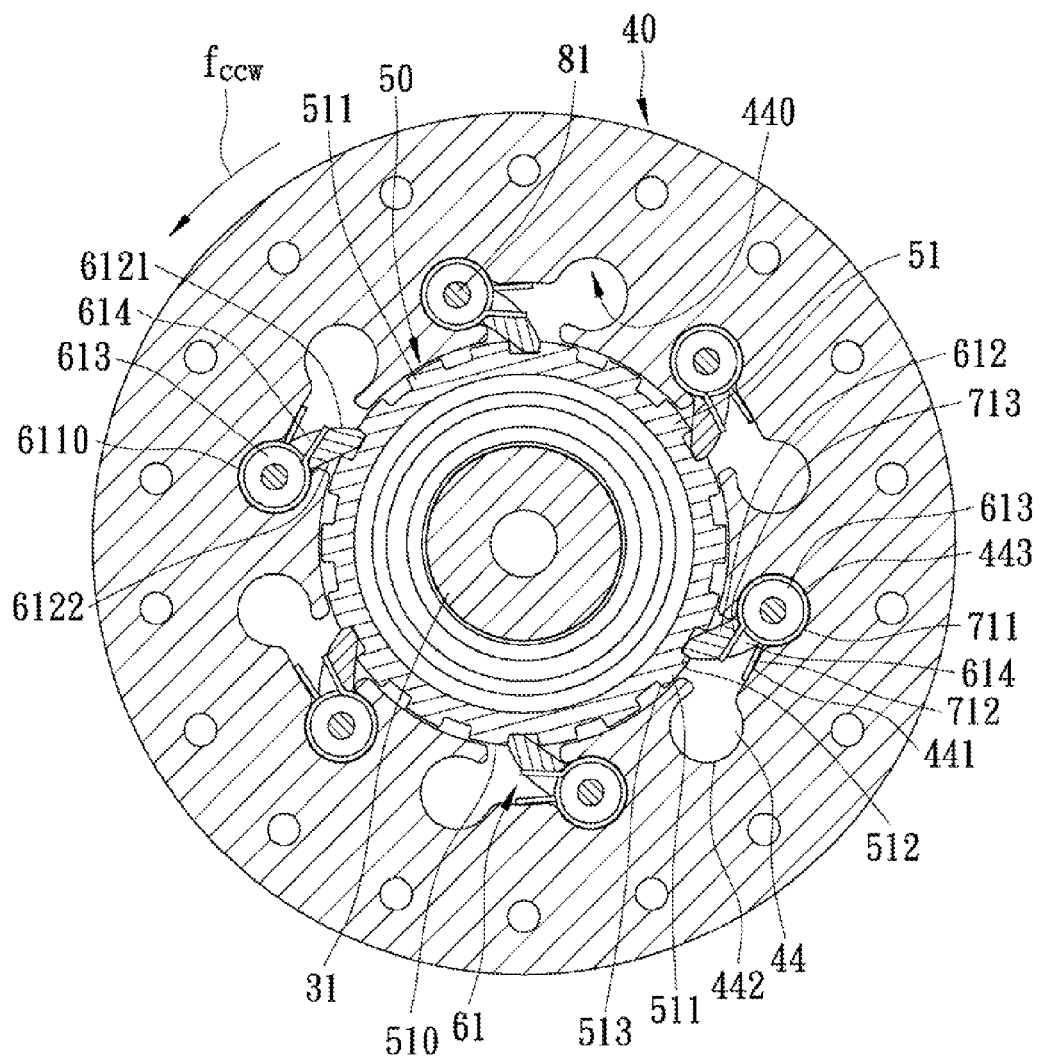
FIG. 8 is similar to FIG. 7 but showing a pawl arrangement for a left-hand drive hub.

When the driving unit 50 is mounted on the right side of the bicycle, i.e., the hub assembly is a right-hand drive type, the joint surface 6110 is pivotable relative to the first retaining wall face 442, as shown in FIG. 7. When the driving unit 50 is mounted on the left side of the bicycle, i.e., the hub assembly is a left-hand drive type, the joint surface 6110 is pivotable relative to the second retaining wall face 443, as shown in FIG. 8.

The pawl end 612 has an acting surface 6121 and a non-acting surface 6122, and extends radially from the pivot end 611 into the annular accommodation space 41, such that the pawl end 612 is movable between a driven position and an idle position. The pivot end 611 is formed to have a gap 613 that extends from the joint surface 6110 toward the pawl end 612.

The elongated mount 810 extends along the pivot axis (X) to bridge the gap 613.

The biasing member 71 has a biasing force to bias the pawl end 612 toward the driven position, and includes a curved segment 711, a first end segment 712, and a second end segment 713. The curved segment 711 is mounted on the elongated mount 810. The first end segment 712 extends out of the gap 613 to abut against the middle retaining wall face 441. The second end segment 713 abuts against the pawl end 612 so as to transmit the biasing force to the pawl end 612.

Preferably, the biasing member 71 is a torsion spring. In this embodiment, the curved segment 711 is in a looped-shape, is sleeved on the elongated mount 810, and is fitted into the gap 613 such that the curved segment 711 is disposed inwardly of the joint surface 6110.

In this embodiment, the pivot end 611 has left and right segments 6111, 6112 that define therebetween the gap 613. The left segment 6111 has a left hole 6113, and the right segment 6112 has a right hole 6114 that is aligned with the left hole 6113 along the pivot axis (X). The elongated mount 810 is formed by a stem 81 having two opposite ends inserted respectively into the left and right holes 6113, 6114. By virtue of such a configuration, the biasing member 71 can be assembled in advance to the pawl 61 by means of the elongated mount 810 before the pawl unit 60 is inserted into the respective retreat bore 44. Accordingly, the pawl units 60 can be installed in a more convenient and effective way in comparison with those of the aforementioned conventional hub assemblies.

Preferably, the pawl end 612 is formed to have a slot 614 that extends from the acting surface 6121 toward the non-acting surface 6122, and that is in communication with the gap 613 so as to permit the second end segment 713 to be disposed in and engaged with the slot 614.

More preferably, the slot 614 has left and right abutment wall surfaces 6141, 6142 that are spaced apart from each other in a direction parallel to the pivot axis (X), and is configured to extend toward the non-acting surface 6122 to form a bottom surface 6143 between the left and right abutment wall surfaces 6141, 6142. The bottom surface 6143 has a sloping region 6144 which is configured to incline toward the pivot axis (X) for abutment by the second end segment 713.

Preferably, each of the left and right segments 6111, 6112 has substantially the same thickness along the pivot axis (X). The pawl end 612 further has left and right outer surfaces 615, 616 opposite to each other in the direction parallel to the pivot axis (X). Preferably, a distance between the left outer surface 615 and the left abutment wall surface 6141 is substantially the same as a distance between the right outer surface 616 and the right abutment wall surface 6142. In other words, the gap 613 and the slot 614 are located substantially in the middle of the pawl 61.

The driving unit 50 is disposed to rotate with respect to the hub axle 31 about the left-to-right axis (L) by means of bearings 32. The driving unit 50 includes an annular ratchet member 51 and a chainring carrier 52 disposed opposite to each other. In this embodiment, the annular ratchet member 51 and the chainring carrier 52 are formed in one-piece. The annular ratchet member 51 has a circumferential surface 510 that confronts the inner tubular wall surface 42 in radial directions. The chainring carrier 52 is disposed outwardly of the hub shell 40.

The circumferential surface 510 has a plurality of teeth 511 angularly displaced from one another about the left-to-right axis (L). Each of the teeth 511 has an abutment edge 512 and a sweeping edge 513 opposite to each other such that, as best shown in FIG. 7, when the annular ratchet member 51 rotates in a clockwise direction ($f_{cw}$), the pawl ends 612 are placed in the driven position where the acting surfaces 6121 thereof are pushed by the abutment edges 512 of corresponding ones of the teeth 511 to thereby bring the hub shell 40 to rotate with the annular ratchet member 51, and such that when the annular ratchet member 51 rotates in a counterclockwise direction, the sweeping edges 513 of the teeth 511 push and sweep past the non-acting surfaces 6122 of the pawl ends 612 against the biasing force of the biasing members 71 to displace the pawl ends 612 toward the idle position to thereby prevent the hub shell 40 from rotating with the annular ratchet member 51.

Referring further to FIG. 8, in the case that the hub assembly is a left-hand drive type, when the annular ratchet member 51 rotates in a counterclockwise direction ($f_{ccw}$), the hub shell 40 is driven to rotate therewith. When the annular ratchet member 51 rotates in a clockwise direction, the hub shell 40 is in an idle state.

In the present invention, since the biasing member 71 is disposed in the gap 613 and the slot 614 that are located in the middle of the pawl 61, the biasing force exerted on the pawl 61 can be more evenly distributed, so that the engagement between the pawl units 60 and the annular ratchet member 51 can be firm and steady.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A hub assembly for a bicycle which has a hub axle, comprising:
    a hub shell which is adapted to be mounted on and rotatable relative to the hub axle about a left-to-right axis, and which has an inner tubular wall surface that is adapted to be spaced apart from the hub axle so as to define an annular accommodation space therebetween, and that extends rightwardly along the left-to-right axis to terminate at a right-side periphery, said inner tubular wall surface having a plurality of retreat bores which are angularly displaced from one another about the left-to-right axis, which are disposed proximate to said right-side periphery, and which extend outwardly and radially, each of said retreat bores being defined by a bore-defining wall which includes first and second retaining wall faces opposite to each other in a circumferential direction, and a middle retaining wall face interposed therebetween;
    a plurality of pawl units each including:
        a pawl including a pivot end which is fitted in a respective one of said retreat bores, and which has a joint surface pivotable relative to one of said first and second retaining wall faces about a pivot axis that is parallel to the left-to-right axis, and a pawl end which has an acting surface and a non-acting surface, and which extends radially from said pivot end into said annular accommodation space, such that said pawl end is movable between a driven position and an idle position, said pawl being formed to have a gap which extends from said joint surface toward said pawl end;
        an elongated mount which extends along the pivot axis to bridge said gap; and
        a biasing member which has a biasing force to bias said pawl end toward the driven position, and which includes a curved segment mounted on said elongated mount, a first end segment extending outwardly of said gap to abut against said middle retaining wall face, and a second end segment abutting against said pawl end so as to transmit said biasing force to said pawl end; and
    an annular ratchet member which is disposed to be rotated with respect to the hub axle, and which has a circumferential surface that confronts said inner tubular wall surface in radial directions, and that has a plurality of teeth angularly displaced from one another about the left-to-right axis, each of said teeth having an abutment edge and a sweeping edge opposite to each other, such that when said annular ratchet member rotates in a clockwise direction, said pawl ends of said pawls of said pawl units are placed in the driven position where said acting surfaces thereof are pushed by said abutment edges of corresponding ones of said teeth to thereby bring said hub shell to rotate with said annular ratchet member, and such that when said annular ratchet member rotates in a counterclockwise direction, said sweeping edges of said teeth sweep past said non-acting surfaces of said pawl ends against the biasing force of said biasing members to displace said pawl ends toward the idle position to thereby prevent said hub shell from rotating with said annular ratchet member.

2. The hub assembly of claim 1, wherein said pawl end is formed to have a slot that extends from said acting surface toward said non-acting surface, and that is in communication with said gap so as to permit said second end segment to be disposed in and engaged with said slot.

3. The hub assembly of claim 2, wherein said slot is defined by left and right abutment wall surfaces that are spaced apart from each other in a direction parallel to the pivot axis, and is configured to extend toward said non-acting surface to form a bottom surface between said left and right abutment wall surfaces, said bottom surface having a sloping region which is configured to incline toward the pivot axis, said second end segment abutting against said sloping region.

4. The hub assembly of claim 3, wherein said curved segment is disposed inwardly of said joint surface.

5. The hub assembly of claim 2, wherein said curved segment is in a looped-shape and is sleeved on said elongated mount.

6. The hub assembly of claim 2, wherein said pawl end further has left and right outer surfaces opposite to each other in the direction parallel to the pivot axis, a distance between said left outer surface and said left abutment wall surface being substantially the same as a distance between said right outer surface and said right abutment wall surface.

7. The hub assembly of claim 1, wherein said pivot end has left and right segments which define therebetween said gap, said left segment having a left hole, said right segment having a right hole that is aligned with said left hole along the pivot axis, said elongated mount being formed by a stem having two opposite ends inserted respectively into said left and right holes.

8. The hub assembly of claim 7, wherein each of said left and right segments has substantially the same thickness along the pivot axis.

* * * * *